No. 879,081.
PATENTED FEB. 11, 1908.
T. CARROLL.
CASH REGISTER.
APPLICATION FILED SEPT. 30, 1898.
7 SHEETS—SHEET 4.
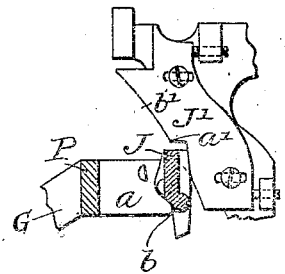
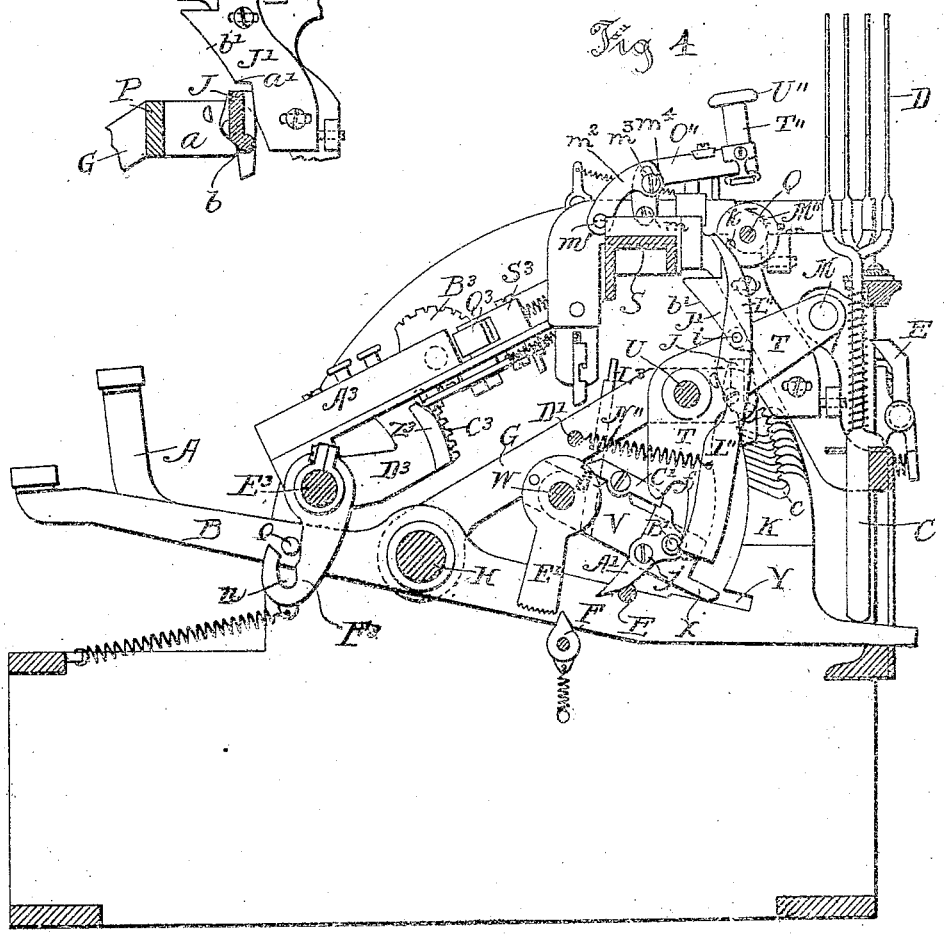

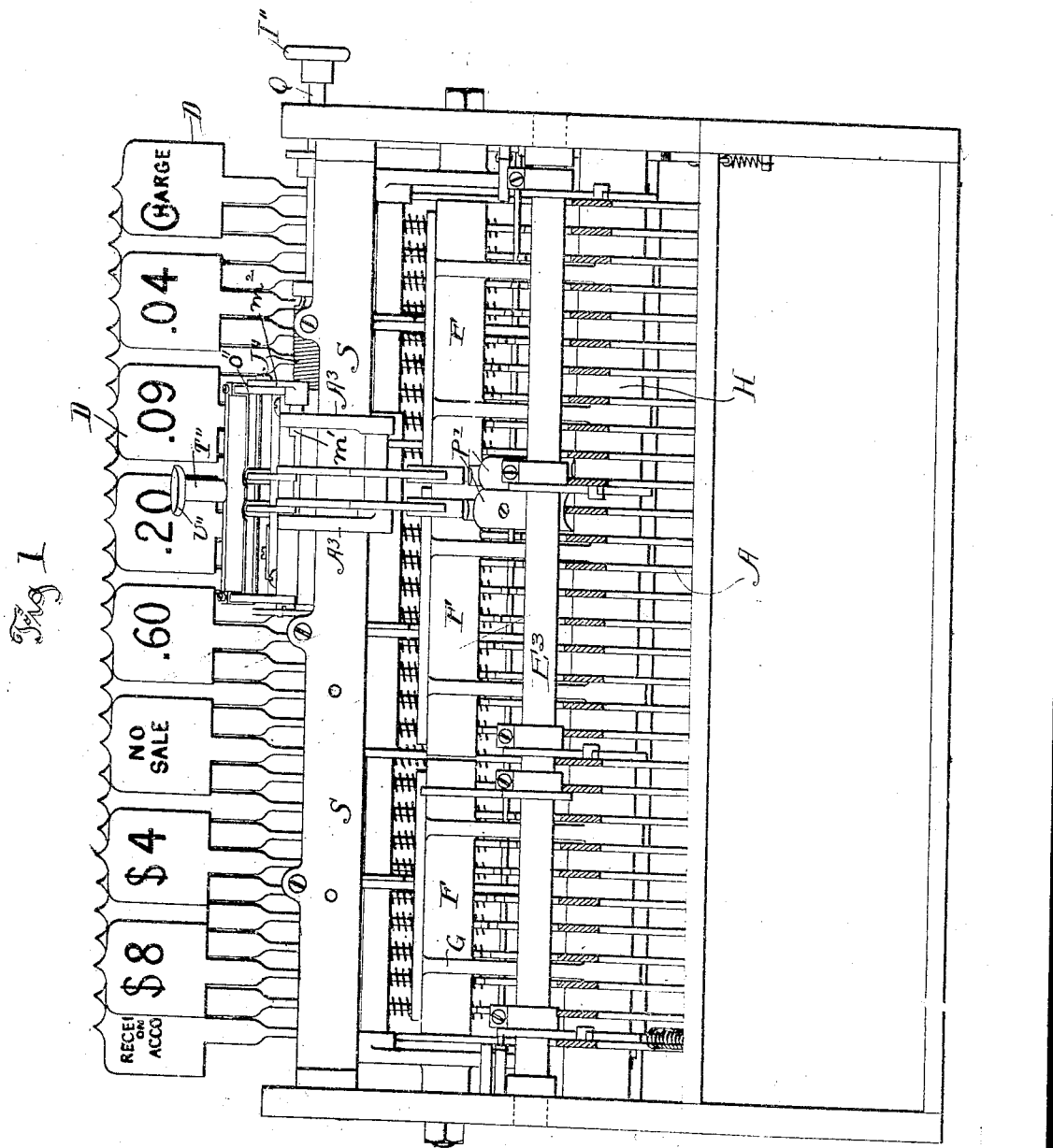

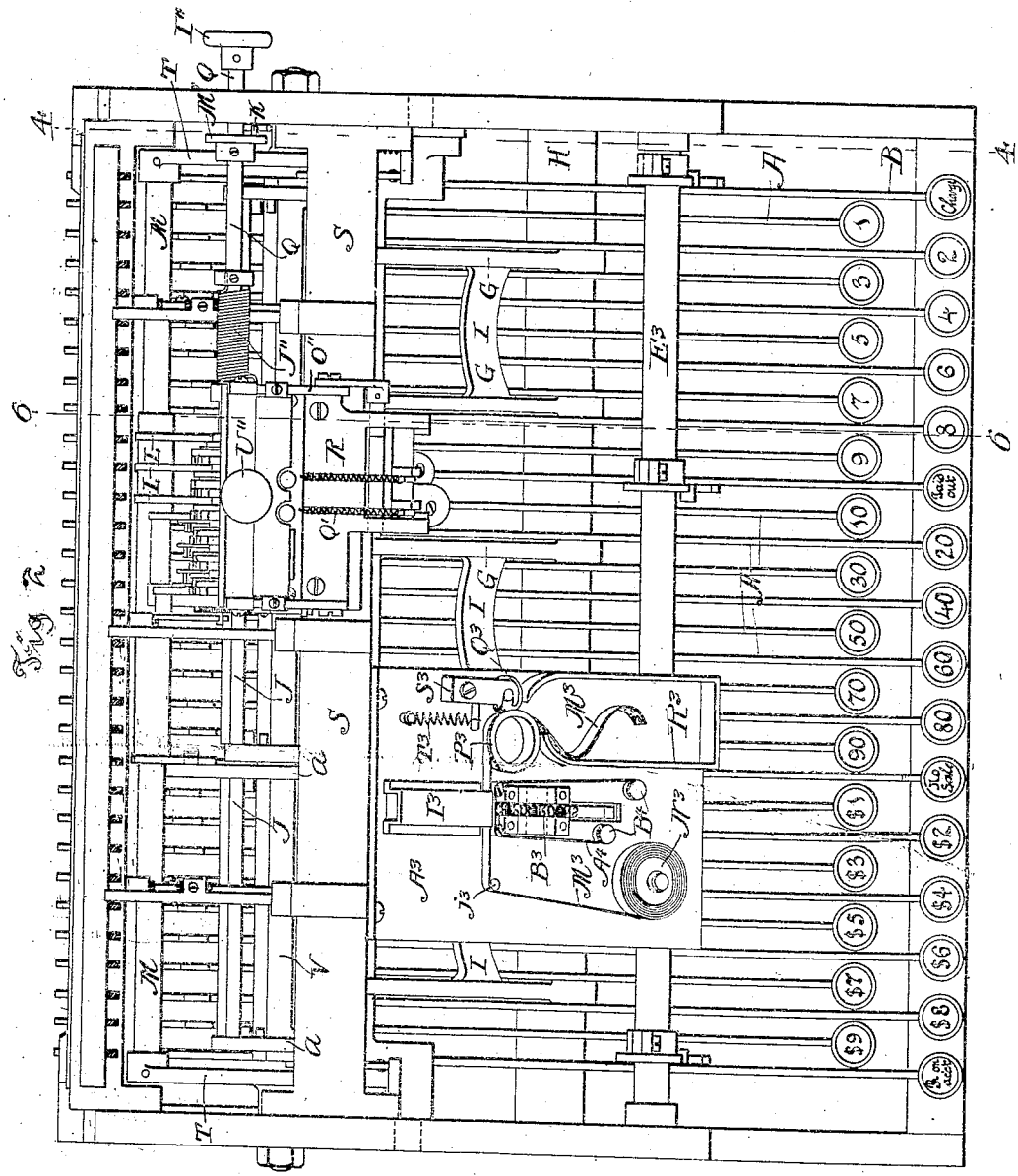

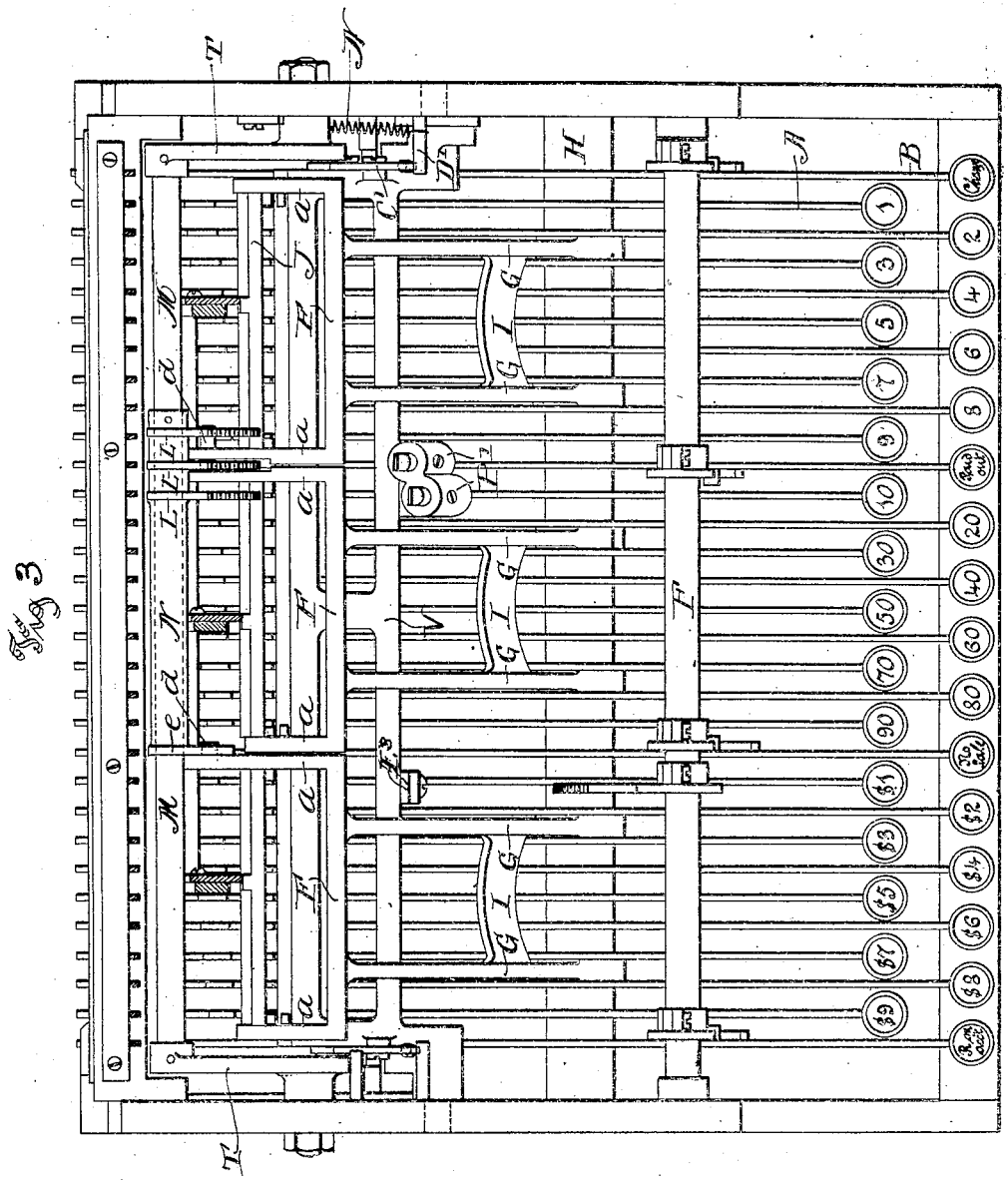

No. 879,081.
PATENTED FEB. 11, 1908.
T. CARROLL.
CASH REGISTER.
APPLICATION FILED SEPT. 30, 1898.
7 SHEETS—SHEET 5.
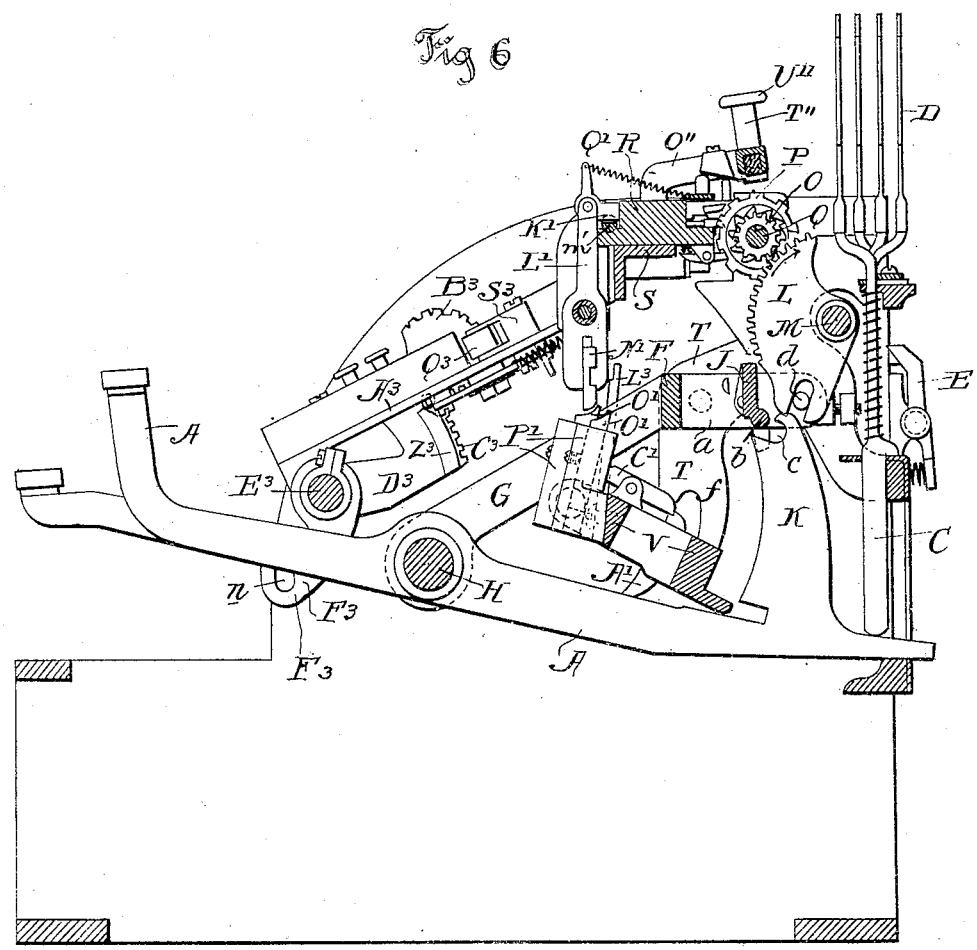

No. 879,081. PATENTED FEB. 11, 1908.
T. CARROLL.
CASH REGISTER.
APPLICATION FILED SEPT. 30, 1898.
7 SHEETS—SHEET 6.
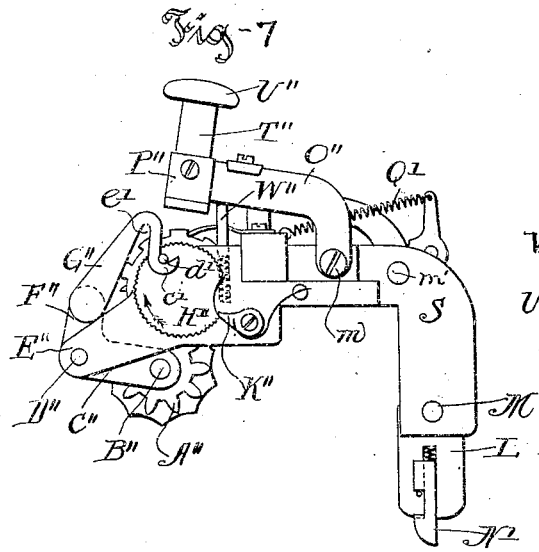
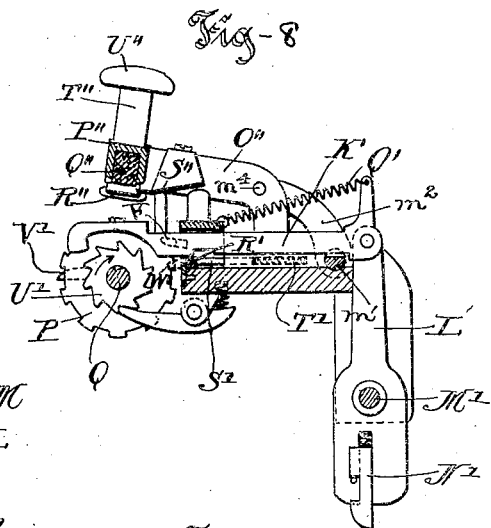
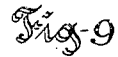
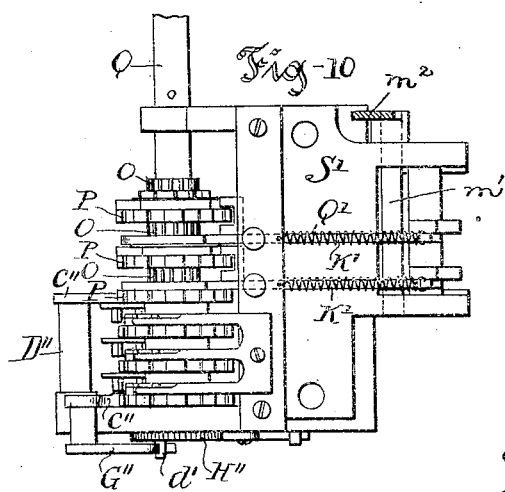
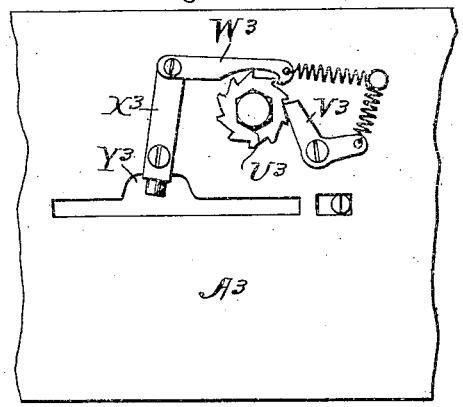
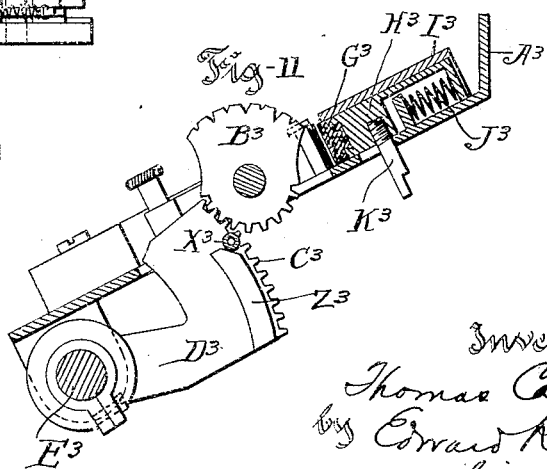
Witnesses
Inventor
Thomas Carroll
by Edward Rector
his Atty

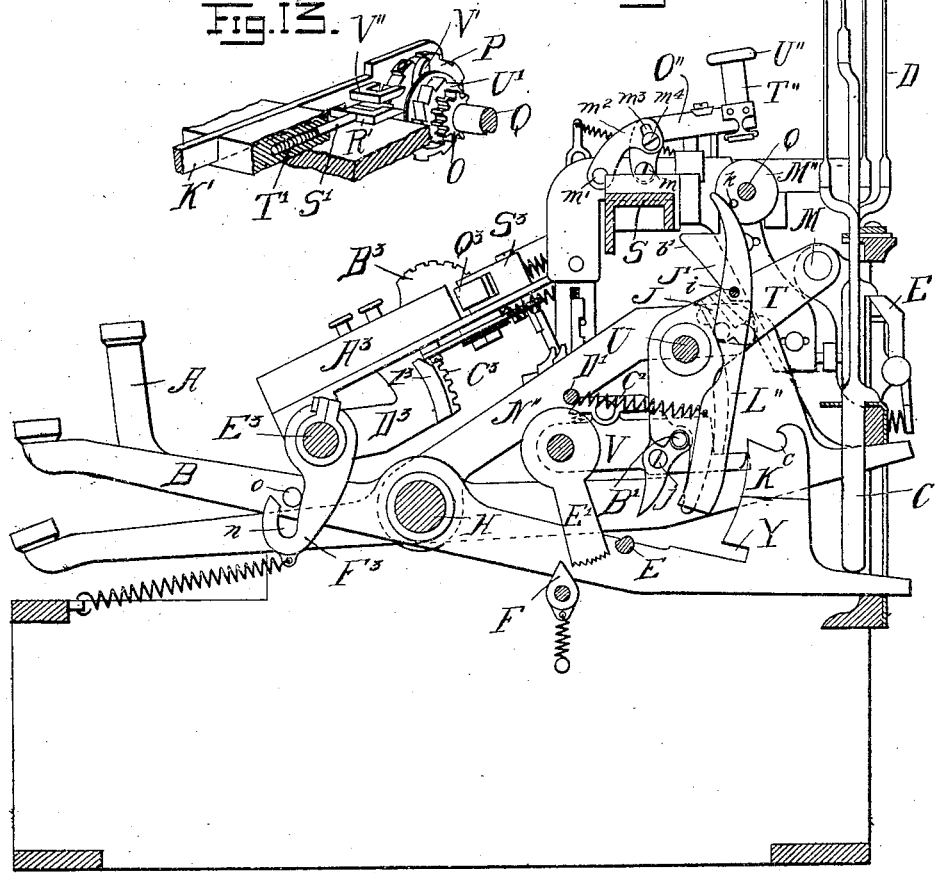
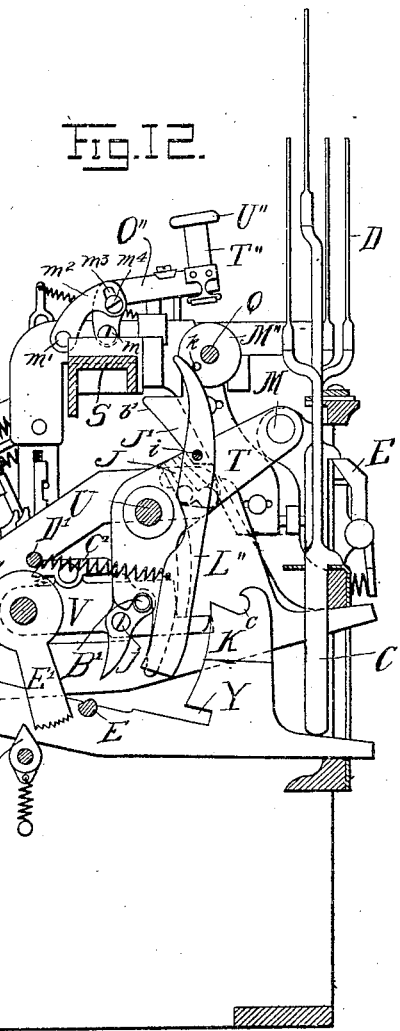
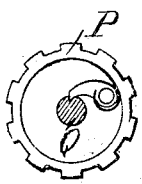

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

No. 879,081.

Specification of Letters Patent.

Patented Feb. 11, 1908.

Application filed September 30, 1898. Serial No. 692,298.

*To all whom it may concern:*

Be it known that I, THOMAS CARROLL, a citizen of the United States of America, residing at Dayton, in the county of Montgomery, in the State of Ohio, have invented a certain new and useful Improvement in Cash-Registers, of which the following is a description, reference being had to the accompanying drawings, forming part of this specification.

My invention relates more particularly to that class of cash registers known as "total-adding" machines, in which the values of a plurality of operating keys, representing different amounts, are added into one common sum or total upon a single set of registering wheels; but certain of its features are applicable to other machines, as will be understood from the description hereinafter given.

In the accompanying drawings Figure 1 is a front elevation of the machine removed from its casing, and with the front ends of the operating keys cut off; Fig. 2 a top-plan view, with the indicators cut off, showing the indicator rods in section; Fig. 3 a view corresponding to Fig. 2, but with certain of the parts shown in Fig. 2 removed, to expose the parts beneath them; Fig. 4 a vertical section approximately on the line 4—4 of Fig. 2; Fig. 5 a detail view of certain of the parts shown in Fig. 4; Fig. 6 a vertical section approximately on the line 6—6 of Fig. 2; Figs. 7 to 11 detail views of various parts hereinafter referred to. Fig. 12 represents a view similar to Fig. 4 with the parts in the positions they assume when a key is depressed. Fig. 13 represents an enlarged detail perspective view of the transfer devices for the counter and, Fig. 14 represents an enlarged detail of one of the counter wheels showing its pawl connection with the shaft.

The same letters of reference are used to represent corresponding parts in the several views.

As shown in Figs. 2 and 3, the machine illustrated in the drawings is equipped with 27 cash keys A, divided into three groups of nine keys each, and with four special keys B representing special transactions, as is common in this class of machines. The key levers coöperate at their rear ends with vertically guided indicator rods C which carry at their upper ends indicators D bearing numbers and signs corresponding to their respective keys, and which are provided upon their rear sides with shoulders or projections coöperating with the usual supporting bar or wing E to temporarily hold the indicators in elevated position, in the well-known manner.

The nine cash keys A in each of the three groups coöperate with a pivoted registering frame, there being three of these frames corresponding to the three groups of keys. As is best shown in Fig. 3 each registering frame consists of a yoke F carried by and in this instance formed integral with the rear ends of two vertically extending arms G which are hung at their forward ends upon the fulcrum rod H of the key levers, Figs. 4 and 6. The two arms G of each frame are rigidly connected near their forward ends by a cross-bar I, in this instance formed integral with them. Hung between the rearwardly projecting arms *a a* of each of the yoke frames F is a bar J, Figs. 2, 3, 4, 5, and 6, the lower edge of which bar J is rounded and projected rearwardly, as shown in Figs. 4, 5, and 6, forming a rod *b* adapted to coöperate with notches *c* in the vertical extensions K of the cash key levers A. As shown in Fig. 4 these extensions K of the key levers A are of graduated lengths in the respective groups, so that in the operation of the several keys of a group the notches *c* of the extensions K of the several keys will engage the rounded edge *b* of the corresponding cross-bar J at different points in the upward movement of the rear ends of the key-levers.

Coöperating with the several cross-bars J are locking plates J', Fig. 5, secured to vertical portions of the framework and provided with shoulders *a'* overlying the upper edges of the bars J when the latter are in normal position, and with curved forward edges *b'* with which the upper edges of the bars J coöperate in the upward movement of the parts. Owing to the presence of these locking shoulders *a'* the frames F cannot be moved upward until the bars J are rocked upon their pivots and their upper edges thrown forward to clear the shoulders *a'*.

When the front end of any key lever is depressed and its rear end lifted the engagement of the notch *c* of the extension K of such lever with the lower edge *b* of the pivoted bar J of the corresponding registering frame will rock said bar upon its pivots, throwing its upper edge forward and its lower edge rearward, thereby engaging the latter snugly in the notch $c$ beneath the hooked portion of the key extension K above said notch, and effecting a positive clutch engagement between the key extension K and cross-bar J, and during the further upward movement of the parts the upper edge of the rocked bar J will travel over the curved forward edge $b'$ of the plate $J'$, Figs. 4 and 5, which will serve to hold the bar J in its rocked position, with its lower rear edge in positive clutch engagement with the extension K of the operated key. In this manner the operated keys become coupled to the corresponding registering frames as soon as their extensions K engage the pivoted cross-bars J carried by said frames, and overthrow movement of the frames in advance of or independently of the keys thereby prevented. Owing to the graduated lengths of the key extensions K in each group the full stroke of each key-lever is caused to move the corresponding registering frame a distance proportionate to the values assigned to such levers.

As shown in Figs. 3 and 6, one of the side arms $a$ of each frame F is extended rearward beyond the cross-bar J and provided with a laterally projecting stud $d$ fitting in a slot in a sector-shaped rack-plate L hung upon a rod M extending transversely of the machine and supported in the manner hereafter described. As best shown in Fig. 3 there are three of these sector-racks grouped closely together upon the rod M and all loose thereon. The two right hand racks are provided with short hubs or sleeves (on their left hand sides) while the left hand rack is fast upon the right hand end of a long sleeve N, which is provided at its left hand end with a downwardly and forwardly projecting arm or plate $e$ having a slot in which fits the stud $d$ upon the rearwardly extending right hand side arm $a$ of the left hand frame F. The studs $d$ of the arms $a$ $a$ of the other two frames F engage slots formed directly in the racks L, as in the case of the one shown in Fig. 6.

The three racks L coöperate with the pinions O of the three right hand wheels of a train of combined registering and typewheels P mounted upon a shaft Q in a fixed frame R secured to the cross-bar S of the framework of the machine, Figs. 2, 6, and 10. Inasmuch as the three racks are connected by the slots and pins with the respective registering frames F, and inasmuch as these frames are given different degrees of movement by the operations of different keys proportionate to the values of such keys, it follows that like movements will be transmitted to the racks L. If, therefore, the racks L be engaged with the pinions O during the movements of the racks in one direction, and disengaged from them during their movements in the other, the registering wheels may be advanced distances proportionate to the values of the operated keys and registration of such values be thereby effected. The necessary engagement and disengagement of the racks and pinions for this purpose is produced in the manner and by the means to be now described.

The rod M upon which the racks are hung is mounted at its opposite ends in the upper rear ends of levers T fulcrumed upon studs U projecting inward from the side frames of the machine about midway of the lengths of the levers, Figs. 3, 4, and 6. The racks L are normally disengaged from the pinions O, as seen in Fig. 6, but it will be understood that if the lower ends of the levers T be swung rearward and their opposite ends be thrown upward and forward the racks will be carried into mesh with the pinions. At each operation of the machine this rocking movement of the levers is effected, the rear ends of the levers being forced rearward at the beginning of the downward stroke of the operated key lever, to engage the racks with the pinion, and being released and permitted to return to normal position, to disengage the racks from the pinions, at the beginning of the return upward stroke of the operated key lever. The means for effecting this rocking of the levers T are best shown in Fig. 4, where V represents the usual vertically movable cross-bar hung at its forward edge upon pivots W and provided at its rear edge with the flange X adapted to coöperate in the usual manner with the slots Y in the key extensions K. Pivoted to the end of the bar V is a lever $A'$ provided with a stud $B'$ (surrounded by an antifriction sleeve,) which bears against the lever T. A spring-pressed latch $C'$ pivoted upon the bar V engages a notch or shoulder on the upper end of the lever $A'$ and holds the latter rigidly in its normal position, with its stud $B'$ bearing against the lever T. The cam edge of the lever T against which the stud $B'$ bears is so shaped that at the first upward movement of the cross-bar V (which is produced by the first downward movement of the front end of any key-lever) forces the lower end of the lever T rearward and throws its opposite end upward and forward and carries the racks into mesh with the pinion. The surface of the lever T engaged by the stud $B'$ is further such that after the lever has been thus rocked, and the racks engaged with the pinions, it will be held in rocked position during the further movement of the parts, until the downward stroke of the operated key lever and upward movement of the cross-bar V are completed. At the end of such movement of the parts the forward end of the latch $C'$ will come in contact with a fixed stud $D'$ projecting inward from the side frame of the machine, which will serve to depress the front end of the latch and throw its rear end upward and disengage it from the lever A', so that the upper end of the latter will be free to swing forward, thereby releasing the lever T and permitting it and the rod M carrying the racks to return to normal position. As the key lever and bar V return to their normal positions the lower end of the lever A' will engage a stud E projecting inward from the side frame of the machine and be rocked back to normal position, permitting the latch C' to reëngage its upper end and hold it in position for the next operation.

For the purpose of preventing the racks being disengaged from the pinions until the full positive movement of the parts is completed and their return or negative movement begun the lower end of the lever T, with which the stud upon the lever A' coöperates, is provided with a notch or recess $f$ which the stud B' enters at the end of its upward movement and thereby locks the lever in position (notwithstanding the tripping of the latch C') until the downward movement of the parts begins and the stud B' becomes disengaged from the notch. This provision is made for preventing the possibility of any overthrow of the registering wheels at the end of the downward stroke of the operated key and positive movement of the parts, as might otherwise occur from the momentum given the registering wheels by a violent operation.

It will be understood, and is also shown in Figs. 3 and 6, that a second set of parts corresponding to those above described is located at the opposite end of the cross-bar V and coöperates in the same manner with the left hand lever T, so that the opposite ends of the rod M are moved in unison.

In connection with this construction for disengaging the racks L from the pinions O after the movement of registration has been completed, it is to be observed that if the racks L be so connected to the key extensions K (which may be considered the actuators of the racks), as to begin to rotate reversely immediately as soon as the keys begin their upward stroke to normal position, this rotary movement of the racks during the time of disengagement from the counter pinions will cause a certain binding effect between the two sets of gears, and for various reasons it is desirable to have such a construction that at the time of the disengagement of the gears there is no relative rotation between the racks and their respective counter pinions. As above stated it is a great disadvantage to be obliged to disengage the racks from their counter pinions at the very end of the down-stroke of the key when the racks and pinions are relatively at rest, for in such a case overthrow of the counter wheels is made possible; but in my construction the racks and counter pinions remain in engagement when the key is at the limit of its down stroke, and are disengaged upon the initial position of the upward stroke of the key; and the rack L is prevented from turning reversely during this time of disengagement by reason of the fact that the construction is such that the pivotal point of the rack L, (viz, the shaft M) is dropping away from the pinion O in the same direction and practically at the same rate of speed as the key extension K and the intermediate member $a$ which carries the pivoted cross-bar J; that is, the member K which serves as the actuator of the rack L to turn the rack about its pivot M is, for the slight distance of disengagement of the gears, dropping away from the pinions practically as one piece with the shaft M and the rack L, and consequently can have no turning effect upon the rack L until the fulcrum M is brought to rest, at which point the continued downward movement of the actuator will evidently then begin to rotate the rack L reversely to bring the same to normal position. Thus it will be seen that by this manner of effecting disengagement by moving the registering racks themselves, I gain a distinct advantage over the construction in which the pivot of the registering rack is stationary and disengagement is effected by moving the counter bodily in and out of mesh with the racks. It is to be of course understood that various forms of constructions might be used to secure this result of withdrawing the rack and also the rack actuator away from the counter pinion in such manner that these parts move practically as one piece during the time of disengagement, I having, as a preferred form of construction, pivoted the frame carrying the pivot shaft M at such a point that the above described result is secured.

An arm E' secured to the end of the cross-bar V coincident with its pivotal support, and having a serrated lower end, Fig. 4, coöperates with the spring-pressed pawl F to insure a complete movement of the parts in opposite directions, as usual.

The transfers between the first and second and second and third registering wheels P, Fig. 10, are effected by reciprocating transfer pawls K', Figs. 6, 8, and 10, which pawls are pivoted at their forward ends to the upper ends of levers L fulcrumed at M' and carrying at their lower ends vertically sliding contact pieces N' which coöperates with the upper ends of rods O' adjustably secured by suitable screws in housings P' fast upon the forward edge of the universal cross-bar V heretofore referred to. The rear faces of the lower ends of the contact pieces N' are rounded off, as are also the forward faces of the upper ends of the rods O', so that during the downward strokes of the operated keys and forward movement of the upper ends of the rods O', the latter will ride under the pieces N' and force said piece upward in their guides upon the levers L', against the resistance of the springs pressing them downward, without moving the levers L'; but at the return movement of the parts the abrupt rear faces of the rods O' will engage the abrupt forward faces of the contact pieces N' and rock the levers L', swinging their upper ends forward and their lower ends rearward until the parts clear each other, whereupon the levers will be reset by springs Q' connected to the pawls K'. In this manner the levers are rocked and the pawls reciprocated at each operation of the machine. The pawls, however, do not necessarily act upon their corresponding registering wheels P at each operation and only do so in event they have been set for transfer, the first pawl by a complete revolution of the primary registering wheel P, and the second pawl by a complete revolution of the second wheel P.

The pawls K' normally rest upon blocks R', Fig. 8, carried by the rear ends of sliding rods or plungers S' confined in housings or bores in the framework and pressed rearward by springs T'. When the parts are in normal position the block R' will hold the pawls K' up, so that they will not, when drawn forward by the rocking of the levers L', engage the ratchets U' upon the registering wheels. Each of the registering wheels is provided with a single projecting tooth or arm V' which, as the wheel completes a revolution, contacts with a beveled projection W' upon the rear side of the block R' and forces the latter rearward (against the resistance of the spring T') until it is brought beneath a notch in the under side of the pawl K'; whereupon the latter will drop downward into position to engage a tooth of the ratchet U' at the next forward movement of the pawl. When the pawl is moved forward it will carry the block R' part way with it, but as its rear end is lifted by riding over the ratchet U' its notch will be disengaged from the block R' and the latter returned to normal position by the spring T'; and when the pawl is again returned to its rearward position the block will support it as before. In this manner and by these means each of the two pawls is set for transfer by a complete revolution of the preceding wheel in the series, and when then actuated advances the succeeding wheel one number to effect the transfer.

Should one of the counter wheels be turned violently forward so as to bring it to the position just preceding the transferring position it will often be overthrown sufficiently to cause the cam V' to engage and operate the projection W' and thus allow the transfer pawl to drop. To counteract this result each of the transfer pawls is provided with a lateral projection V'' shown in dotted lines in Fig. 8 and which is so arranged as to be engaged by the cam V'. When the wheel overthrows as before stated the pawl descends but as the wheel settles back to its proper position the cam V' engages the projection V'' and again raises the pawl to its normal position so that the block R' may pass forward under the same.

The transfers between the fourth, fifth, and sixth registering wheels are effected by a train of transfer pinions A'', Fig. 7, which are mounted upon a rod B'' supported at its opposite ends in arms C'' fast upon and projecting forwardly from a rock-shaft D'', Figs. 7 and 10, journaled at its left hand end in a rearwardly extending arm E'' of the fixed frameplate. The left hand one of the two arms C'' has a vertical extension F'', making the arm a bell crank. A laterally projecting stud C''' mounted on the vertical extension F'' supports an upwardly and forwardly projecting reversely bent arm G'' having its extremity formed into a hook c', Figs. 7 and 10. It will be seen that when the arm G'' is pressed rearwardly and held in such position, as in Fig. 7, the train of transfer pinions A'' will be held up in mesh with the coöperating pinions on the registering wheel, and that when the arm G'' is released the gravity of the train of pinions A'' will cause them to drop out of engagement with the pinions of the registering wheels. The shaft Q upon which the registering wheels are mounted, Figs. 4, 6, and 8, is provided with a longitudinal groove with which coöperate pawls carried by the registering wheels in such manner that when the shaft Q is given a complete revolution in the direction of the arrow in Figs. 7 8 and 14 it will pick up all of the registering wheels wherever they may have been left standing and carry them to zero or initial position. Secured upon the left hand end of the shaft Q is a serrated disk H'', Fig. 7, having projecting from its face a stud d' which coöperates with the bent arm G''. As shown in Fig. 2 the right hand end of the shaft Q extends to and through the side frame of the machine, and is provided upon its ends with a thumb-piece I'' for turning it. As also shown in said view the shaft is surrounded by a coiled spring J'' one end of which is fastened to the shaft and the other to a fixed part of the framework. This yieldingly holds the shaft in normal position and resists the turning of the shaft in the direction indicated by the arrows in Figs. 7 and 8. The spring therefore presses the stud d' on the disk H'' against the arm G'' and holds the latter in rearward position, with the transfer pinions A'' in mesh with the pinions on the registering wheels. When it is desired to reset the wheels to zero the shaft Q is turned forward (in the direction of the arrows) a complete revolution. As it moves forward from normal position the stud d' will be carried away from the arm G'' and the latter will be swung forward by the drop of the transfer pinions A'', and as the shaft approaches the end of its revolution the stud $d'$ will enter the recess $e'$ formed by the downward bend of the arm G'' and be arrested thereby just as it has completed a revolution. Upon then removing the hand from the thumb-piece $l''$ of the shaft Q and releasing the latter the spring J'' will turn it back to normal position, and as it approaches such position the stud $d'$ will contact with the forward edge of the arm G'' and press the latter back to normal position and swing the pinions A'' upward into engagement with the registering wheel pinions again, the stud $d'$ being arrested by and coming to rest in the hook $c'$ of the arm G'', as shown in Fig. 7. To reset the registering wheels at any time, therefore, it is simply necessary to turn the shaft Q forward by means of the thumb-piece $l''$ until it comes to a positive stop, and then release it and permit its spring to return it to normal position.

A spring-pressed pawl K'' (Fig. 7) coöperates with the serrated periphery of the disk H'', and with a curved recess cut therein, to compel a complete movement of said disk and the shaft Q in opposite directions. For the purpose of locking the machine from operation while the registering wheels are being reset in this manner at any time there is provided a locking lever L'', Fig. 4, hung to the framework at $i$, whose lower end is adapted to be swung forward over a stud $j$ projecting from the end of the cross-bar V, such stud in the present instance also forming the pivot of the lever A' heretofore described. The shaft Q has fast upon it a disk M'', Figs. 2 and 4, provided with a stud $k$ adapted to coöperate with the upper end of the lever L''. When the shaft Q and disk M'' are in normal position the engagement of the stud $k$ with the upper end of the lower L'' holds the lever in normal position against the stress of a spring N'' tending to pull its lower end forward into the path of the stud $j$ upon the bar V. When, however, the shaft Q is turned forward to reset the registering wheels the stud $k$ will be carried away from the lever L'' and the spring N'' will pull the lower end of the lever forward into the path of the stud $j$, the forward movement of the lever under the stress of the spring being limited by contact of the lever with the stud U. In this manner and by these means whenever the shaft Q is turned forward to reset the registering wheels the lever L'' is moved into position to lock the machine from operation, and is moved out of such locking position, and the machine released, when the shaft Q is returned to normal position.

As heretofore stated, the registering wheels P are combined registering wheels and type wheels, the numbers upon the wheels being type-numbers from which impressions may be taken. For the purpose of taking an imprint of the total shown by the registering wheels at any time there is provided an impression frame consisting of two side arms O'' pivoted at their forward ends to the framework at $m$ and connected at their rear ends by a cross-bar P'' which is provided in its under side with a longitudinal recess in which is seated an impression pad Q'', Figs. 1, 2, 4, 6, 7, and 8. Suspended longitudinally of the bar P'' and pad Q'', beneath the same, is an inking ribbon R'' connected at its opposite ends to supports depending from the ends of the bar P'', and separated from the under side of the pad Q'' a sufficient distance for the free insertion of a card or ticket between the pad and ribbon. Secured between the side arms O'', forward of the bar P'' and pad Q'', is a guide-plate S'' upon which the card or ticket may be placed and its rear edge thence readily slid rearward between the pad Q'' and ribbon R''. Upon then depressing the bar P'' and pad Q'' until the ticket and ribbon are forced against the types at the printing line the amount registered may be printed upon the ticket. The bar P'' has secured to and projecting vertically from its middle a post T'' carrying at its upper end a striking piece U'' upon which a blow may be struck with the hand to effect the printing. The swinging impression frame will be returned to normal position, after the printing has been effected, by spring-pressed plungers W'', Fig. 7.

It will be observed that whenever the registering wheels P are turned to zero the transfer cams V' will strike and retract the plungers S' and the blocks $r'$ carried thereby, whereby all the transfer pawls will drop into position to move the registering wheels one step. Therefore to prevent this improper transfer upon the succeeding operation of the machine I provide means for restoring the transfer pawls to inoperative position (as shown in Fig. 8) by the operation of printing the zeros registration. To this end a short transverse rock shaft $m'$ which is flattened upon its upper side, is suitably journaled in the fixed frame as shown in Figs. 4, 8 and 10. This shaft passes under the transfer pawl K' the lower edges of which are normally parallel to and slightly above the flattened side of the rock shaft (Fig. 8). Upon the right hand end of the rock-shaft is rigidly secured an arm $m^2$ which extends rearwardly, and near its rear end is provided with an inclined slot $m^3$ through which passes a screw stud $m^4$ which is fastened into the side arm O'' of the impression frame. By this means it will readily be seen that whenever the impression frame is forced downward against the type the arm $m^2$ will be swung downward and thereby the shaft $m'$ will be rocked. One of the edges of the flat side of the said shaft will thereby be brought into contact with and finally will raise the transfer pawls K' so that the plungers S' will be moved forward carrying the block R', thereby restoring the transfer pawls to normally inoperative position. In order to insure complete turning to zero, the proprietor is supposed to take an impression from the printing wheels after the turning to zero operation, and put the slip containing this impression in the cash drawer or other safe place so that he can assure himself if any question arises that the counter was completely turned back.

The remaining feature of the machine relates to a printing device by which characters representing the special transactions are printed upon a paper strip at the operations of the several special keys. As shown in Figs. 2, 4 and 6, there is secured to the forward edge of the frame-plate S a forwardly extending and downwardly inclined supplemental frame-plate $A^3$ in a vertical opening in which is mounted a type carrier $B^3$, Fig. 11, which is geared to a rack $C^3$ carried by an arm $D^3$ fast upon a rock-shaft $E^3$ extending entirely across the machine and journaled at its opposite ends in the side frames thereof. The rock-shaft $E^3$ has secured to it adjacent the respective special keys B depending arms $F^3$, Figs. 4 and 6 provided with recesses $n$ adapted to coöperate with studs $o$ projecting from the sides of the keys B. The walls of the recesses $n$ in the several arms $F^3$ have different degrees of inclination, with the result that the shaft $E^3$ will be rocked different degrees by the depression of the different keys B, and the type-carrier $B^3$ thereby be moved to different positions at the operations of different keys. The type-carrier $B^3$ is provided upon its periphery with type-characters indicating the special transactions, as shown in Fig. 2, and whenever any one of the special keys is depressed the type-carrier is so moved a to bring the type-character corresponding to such key to the printing line, which is in rear of and slightly above the horizontal plane of the pivotal axis of the type-carrier, Fig. 11. An impression pad $G^3$ coöperates with the type-carrier, at the printing line, said pad being seated in the front end of a sliding block or plunger $H^3$ mounted in a guide-way $I^3$ secured upon the frame-plate $A^3$, Figs. 2 and 11. A spring $J^3$ interposed between the block $H^3$ and a fixed flange upon the frame-plate $A^3$, Fig. 11, presses the block $H^3$ rearward and yieldingly holds it in normal position.

Secured into the under side of the block $H^3$ and depending therefrom through a slot in the frame-plate $A^3$, is a stud $K^3$ which is adapted to be struck, just at the end of the downward stroke of any operated key, by an arm $L^3$ secured to and projecting vertically from the forward edge of the universal cross-bar V, Figs. 3 and 6, the engagement of which arm $L^3$ with the stud $K^3$ forces the block $A^3$ forward and carries the pad $G^3$ against the type upon the carrier $B^3$ in event the latter has been turned to printing position by the operation of one of the special keys; otherwise the forward movement of the block $H^3$ and pad $G^3$ is an idle one, as when the cash keys are operated. A paper strip $M^3$ is carried upon a reel $N^3$ mounted on a stud or spindle projecting from the upper surface of the frame-plate $A^3$, Fig. 2, and is led thence upward and rearward over a guide $j^3$, thence transversely across the type-carrier, between the latter and the impression pad $G^3$, thence between two feed-rollers $P^3 Q^3$, and thence into a receptacle $R^3$ upon the frame-plate $A^3$. The feed-roller $Q^3$ is mounted in a pivoted support $S^3$ upon the plate $A^3$, to a pin projecting from which pivoted support is connected a spring $T^3$ which serves to press the roller $Q^3$ against the roller $P^3$. The spindle or hub of the roller $P^3$ extends downward through the plate $A^3$ and has fast upon its under side a ratchet $U^3$, Fig. 9, which is engaged by a spring-pressed holding pawl $V^3$ and by a spring-pressed actuating pawl $W^3$, the latter pivoted to the long arm of a lever $X^3$ fulcrumed upon the under side of the plate $A^3$ and having its short arm projecting across a recess $Y^3$ formed in the plate $A^3$ at the side of the slot through which the type-sector $B^3$ and rack $C^3$ pass. As shown in Fig. 11 the rack $C^3$ has fast upon its side a cam-plate $Z^3$ which coöperates with the rounded end of the lever $X^3$ to reciprocate the latter at each actuation of the rack $C^3$ by one of the special keys, for the purpose of causing the pawl $W^3$ to turn the ratchet $U^3$ and feed-roller $P^3$ and thereby advance the record strip $M^3$.

An inking ribbon $A^4$ mounted upon spools or studs $B^4$ journaled in the frame-plate $A^3$ and provided with milled thumb-pieces for turning them is led across the printing point and serves to ink the type upon the carrier $B^3$, Fig. 2.

Having thus fully described my invention, I claim:

1. In a cash register the combination with a series of keys, of a counter, a rock frame, a series of movable register operating elements journaled in the rock frame, means connecting the keys to said elements and devices for actuating the rock frame from the keys; the construction being such that the frame is first moved to bring the operating elements into connection with the counter and said elements subsequently actuated.

2. In a cash register the combination with a series of keys, of a counter, a rock frame, a series of counter operating racks mounted in the rock frame, means connecting the keys to said racks, and devices connecting the keys to the rock frame; the construction being such that the rock frame is first actuated, to bring the racks into connection with the counter and said racks subsequently moved.

3. In a cash register, the combination with a register comprising a plurality of independently operable elements, of a plurality of oscillatory operating racks therefor, a rocking pivot on which said racks are journaled, and means for oscillating said racks and rocking said pivot to carry said racks into and out of mesh with the register elements.

4. In a cash register, the combination of a train of registering wheels mounted in a fixed frame, a rocking frame carrying a series of racks a plurality of sets of keys, one set coöperating with each rack to cause the latter to be given different degrees of movement proportionate to the operated key, and means for rocking the frame carrying the racks to simultaneously gear them with and ungear them from the registering wheels.

5. In a cash register, the combination of a train of registering wheels mounted in a fixed frame, a rocking frame carrying a series of racks a plurality of sets of keys, one set coöperating with each rack to cause the latter to be given different degrees of movement proportionate to the operated key, and means actuated by said keys for rocking the frame carrying the racks to simultaneously gear the latter with and ungear them from the registering wheels.

6. In a cash register, the combination of a train of registering wheels mounted in a fixed frame, a plurality of oscillatory racks mounted in a rocking frame, a plurality of sets of keys, one set for each rack and coöperating therewith to move the rack different degrees according to the value of the operated key, and a movable bar common to all of the keys and coöperating with the rocking frame to simultaneously throw the racks into and out of gear with the registering wheels.

7. In a cash register, the combination of the train of registering wheels P mounted in a fixed frame, the rocking frame composed of the levers T T and rod or shaft M, the racks L mounted upon the rod M, the key-levers A coöperating with the racks to give them different degrees of movement, the movable cross-bar V common to the key levers A, the levers A' carried by the cross-bar V and coöperating with the levers T T, and the latches C' coöperating with the levers A', substantially as described.

8. In a cash register, the combination of the movable registering frame F, the bar J pivoted therein, the key-levers A provided with the key extensions K having the notches c coöperating with the edge of the bar J, and the curved plate J' coöperating with the opposite edge of the bar J, substantially as described.

9. In a cash register, the combination of the registering frame F, the bar J pivoted therein and having the rounded and rearwardly projecting lower edge b, the key levers A having the extensions K provided with the notches c coöperating with the rounded edge b of the bar J, and the fixed plate J' having the locking shoulder a' and curved surfaces b' coöperating with the upper edge of the bar J, substantially as described.

10. In a cash register, the combination of the key-levers A, the registering frame composed of the side arms G G hung at their forward ends upon the fulcrum rods of the key levers and carrying at their rear ends the yoke-frame F having the rearwardly extending side arms a a, the bar J pivoted between the arms a a and coöperating at its lower edge with the notches c in the key extensions K, and the plate J' coöperating with the bar J, substantially as described.

11. In a cash register, the combination of a plurality of key levers, a registering frame hung upon the fulcrum rod of said levers and given different degrees of movement by the operations of different levers, an oscillatory rack mounted upon an independent support and connected with the registering frame so as to move therewith, a registering wheel, and means for throwing the rack and registering wheel into and out of gear with each other.

12. In a cash register, the combination of a plurality of key levers, a registering frame hung upon the fulcrum rod of said levers and given different degrees of movement by the operations of different levers, an oscillatory rack mounted upon an independent support, a slot-and-pin connection between the registering frame and rack whereby the rack is actuated by the registering frame, a registering wheel, and means for gearing and ungearing the rack and registering wheel.

13. In a cash register, the combination of a counter, a movable frame, a series of counter operating racks mounted on said frame, a series of keys for actuating said racks and a movable member common to all of the keys and coöperating with the movable frame to actuate the same, and bring the racks into connection with the counter.

14. In a cash register, the combination with a counter, of a movable frame, a series of pivoted racks mounted on said frame, a series of keys for actuating said racks and a member common to all of said keys and arranged to move said frame, to bring the racks into connection with the counter.

15. In a cash register, the combination, with the registering wheels P, transfer pawls K' and coöperating devices, of the levers L' connected at their upper ends to the pawls K' and carrying at their lower ends the sliding contact pieces N', the operating key levers A, the universal cross-bar V, and the adjustable projections O' carried by said cross-bar and coöperating with the sliding contact-pieces N' of the levers L', substantially as described.

16. In a cash register, the combination, with the combined registering and type wheels P, of the pivoted frame O'' carrying the pad Q'' and having the hand-stamp T'' U'' and inking ribbon R'', and the guide shelf or plate S'' for guiding the card or ticket between the pad Q'' and inking ribbon R'', substantially as described.

17. In a cash register the combination of a counter, a movable frame, a plurality of oscillatory racks mounted on said frame and a series of keys for actuating said racks and moving said frame to simultaneously bring all of said racks into engagement with the counter.

18. In a cash register, the combination of a plurality of special keys, a rock-shaft, graduated cam arms projecting rigidly from said shaft and engaged by the several keys to rock the shaft different degrees according to the several keys, a type-carrier geared to said rock-shaft and bearing a series of type-characters corresponding to several keys, a platen actuated by the keys and coöperating with the type-carrier, and a pair of feed rollers also actuated by the keys and operating to draw a paper strip across the printing point.

19. In a cash register, the combination of the special keys B, the rock-shaft $E^3$, the arms $F^3$ projecting therefrom and provided with the recesses $n$ coöperating with the projections $o$ upon the keys B, the sector-rack $D^3$ secured to the rock-shaft $E^3$, the type-carrier $B^3$ geared to the sector $C^3$, the reciprocating platen $H^3$ provided with the impression pad $G^3$ coöperating with the type-carrier $B^3$, the spring $J^3$ acting upon the platen $H^3$, the universal bar V provided with the arm $L^3$ coöperating with the projections $K^3$ on the platen $H^3$, the feed rollers $P^3$ $Q^3$ for drawing the paper strip $M^3$ across the printing point, the ratchet $U^3$ secured to the roller $P^3$, the lever $X^3$ actuated by the plate $Z^3$ upon the sector-rack $C^3$, and the pawl $W^3$ actuated by the lever $X^3$ and coöperating with the ratchet $U^3$, substantially as described.

20. In a cash register, the combination, with the main frame of the machine, of the supplemental frame-plate $A^3$ secured thereto, the type-carrier $B^3$ pivoted in a slot in the plate $A^3$, the guide-way $J^3$ secured upon the plate $A^3$, the reciprocating platen $H^3$ located in said guide-way and carrying the impression pad $G^3$, the spring $J^3$, the feed rollers $P^3$ $Q^3$, the latter mounted in a pivoted support and spring-pressed toward the roller $P^3$, the reel $M^3$ carrying the roll of paper strip $N^3$ led from the reel across the printing point and between the rollers $P^3$ $Q^3$ and thence delivered into the receptacle $R^3$ upon the plate $A^3$, the special keys and connections with the same for setting the type-carrier $B^3$ and actuating the feed roller $P^3$, and the universal bar operated by the keys and provided with the arm coöperating with the projections $K^3$ upon the platen $H^3$, substantially as described.

21. In a cash register, the combination with a series of keys, of a counter having driving pinions, a rock frame, a series of frames mounted on the rock frame and provided respectively with racks adapted to be simultaneously brought into mesh with the pinions of the counter and means connected to the keys for first moving the rock frame and then the register operating frames.

22. In a cash register, the combination with a counter of a movable frame, counter operating racks mounted on said frame, a series of keys, a movable member common to said keys, a movable device mounted on said member and arranged to operate the movable frame, and means for tripping said device after it has made a portion of its movement.

23. In a cash register, the combination with a counter, of a movable frame, counter operating racks mounted on said frame, a series of keys, a movable member common to said keys, a pivoted device mounted on said member and arranged to operate the movable frame and a latch for said device arranged to be tripped to release it.

24. In a cash register, the combination of a counter, a movable frame, a series of counter operating racks mounted on said frame, a series of keys for actuating said racks, a key coupler common to all of the keys and means mounted on said coupler for actuating the movable frame to simultaneously bring all the racks into engagement with the counter.

25. In a cash register, the combination of a plurality of keys, a pivoted registering frame arranged to be given different degrees of movement by the different keys, an independent movable support, an oscillatory rack mounted upon the same and connected to the registering frame so as to move therewith, a registering wheel, and means common to the keys for moving the independent support independently of the registering frame.

26. In a cash register the combination of a plurality of keys, a pivoted registering frame arranged to be given different degrees of movement by the different keys, an oscillatory rack mounted upon an independent movable support and connected to the registering frame so as to move therewith, a registering wheel and means for throwing the rack and registering wheel into and out of gear with each other by the actuation of the movable support.

27. In a cash register the combination of a counter, a series of transfer pawls and a printing device arranged when operated to bring any transfer pawls that have been set to normal position.

28. In a cash register, the combination with a counter comprising a series of counter wheels having printing types formed thereon and a series of transfer pawls of a movable platen for printing from said types and means operated by the platen for resetting the transfer pawls.

29. In a cash register, the combination with a counter comprising a series of counter wheels having printing types formed thereon and a series of transfer pawls, of a movable arm carrying a platen arranged to print from said types, and devices operated by said arm for resetting the transfer pawls.

30. In a cash register the combination with a counter comprising a series of counter wheels having printing types formed thereon, a series of transfer pawls, and latches for said pawls, of a movable platen and means operated by said platen for resetting the transfer pawls in connection with their latches.

31. In a cash register the combination with a series of keys, of printing types arranged to be set by the same, a member common to and operated by any one of said keys, a rigid arm carried by said member, and a slide carrying a platen and formed with a projection arranged to be struck by said arm.

32. In a cash register, the combination with a series of keys, of printing types arranged to be set by the same, a member common to and arranged to be operated by any one of said keys, a rigid arm carried by said member, a spring pressed slide carrying a platen and a projection on said slide arranged to be engaged by said rigid arm.

33. In a cash register, the combination with a series of keys, of an operating gear arranged to be moved different distances by said keys, a printing device operated by said gear, a strip feeding mechanism and a projection mounted on the gear and arranged to operate said mechanism upon any movement of said gear.

34. In a cash register, the combination with a series of keys, of an operating gear arranged to be moved different distances by said keys, a printing device operated by said gear, a strip feeding mechanism, and a cam mounted on the gear and arranged to actuate the feeding mechanism upon any movement of said gear.

35. In a cash register the combination with a series of keys, of an operating gear arranged to be moved different distances by said keys, a printing device operated by said gear, a strip feeding mechanism, a projection mounted on the gear and arranged to operate the feeding mechanism upon any movement of said gear, and a receptacle for receiving the strip after it passes the feeding mechanism.

36. In a cash register, the combination with a movable registering frame, of a series of keys, movable means mounted on said frame and arranged to couple the keys thereto, and a stationary device engaged by said means to hold it in coupling position for a predetermined period and then release it.

37. In a cash register the combination with a movable registering frame, of a series of keys, movable means mounted on said frame and arranged to couple the keys thereto, and a stationary device engaging said movable coupling means for locking the frame until the coupling has been effected.

38. In a cash register, the combination with a movable registering frame, of a series of keys, movable means mounted on said frame and arranged to couple the keys thereto when moved from its normal position and a relatively stationary plate having a locking shoulder and arranged to be engaged by said movable means for locking the frame and for holding the means in coupling position when so moved.

39. In a cash register, the combination with a main frame of a movable registering frame, a bar movably mounted in the same and normally engaging a stationary part of the main frame to lock the registering frame and a series of keys arranged to move said bar out of normal position and thereby become coupled thereto.

40. In a cash register the combination with a registering frame, of a coupling bar pivoted therein, a series of keys arranged to tip said bar and thereby become coupled thereto and a stationary plate having a shoulder under which said bar normally locks and a guiding edge for holding the bar in its tipped condition.

41. In a cash register the combination with a counter, of a movable frame carrying counter operating devices and formed with operating arms and locking notches, a series of keys, a movable member common to said keys, and movable shifting devices mounted on said member and carrying studs arranged to engage said arms and enter said notches.

42. In a cash register the combination with a counter, of a movable frame carrying counter operating devices and formed with cam arms, a series of keys, a movable member common to said keys, and movable shifting devices mounted on said member and engaging said cam arms to operate the movable frame.

43. In a cash register the combination with a counter, of a movable frame carrying counter operating devices, a series of keys, a movable member common to all of said keys, pivoted operating devices mounted on said member and engaging the frame, latches for holding said devices to their work and means for tripping said latches.

44. In a cash register the combination with a counter, of a movable frame carrying counter operating devices, a series of keys, a movable member common to all of said keys, pivoted operating devices mounted on said member and engaging the frame, latches for said devices and relatively stationary means for tripping said latches and for resetting the operating devices in connection with the latches.

45. In a cash register, the combination with a series of keys, of a rock-frame, a counter, registering racks carried by the rock-frame and normally disengaged from the counter, and means operated by the keys for first swinging the rock frame so as to simultaneously bring the registering racks into engagement with the counter and then moving said racks so as to turn the counter wheels.

46. In a cash register, the combination with a series of keys, of a movable member common to all the keys and arranged to be actuated by the operation of any key, a rock-frame, a counter, registering racks carried by the rock-frame and normally disengaged from the counter, and means operated by the keys for first swinging the rock-frame so as to simultaneously bring the registering racks into engagement with the counter, and then moving said racks so as to turn the counter wheels.

47. In a cash register, the combination with the counter, of a rock-frame, registering racks carried by the rock-frame and normally disengaged from the counter, a series of normally disengaged keys arranged to drive the registering racks, and means for, first, engaging the operated keys, second, swinging the rock-frame so as to simultaneously bring the registering racks into engagement with the counter, and finally, moving said racks so as to turn the counter wheels.

48. In a cash register the combination with a series of keys, of a counter, a rock frame, a series of counter-operating racks mounted on said frame, means for operating the frame from the keys, and a series of movable rack operating elements mounted independently of the rock frame and arranged to be actuated by the keys.

49. In a cash register, the combination with a counter, of a registering rack; an independently mounted intermediate member having slot and pin connection with said rack; and a series of keys formed with provisions for engaging said intermediate member and through it giving said rack graduated movements.

50. In a cash register the combination with a series of keys, of a type carrier, a differential setting device for the carrier, a strip feeding mechanism, and means operated by the setting device for actuating said feeding mechanism.

51. In a cash register the combination with a series of operating keys, of a type carrier, a setting device therefor actuated by the keys, a strip feeding mechanism, and operating means intermediate the setting device and the feeding mechanism.

52. In a cash register the combination with a series of operating keys, of a type carrier, a key operated actuator therefor, strip feeding rollers, and means intermediate the carrier actuator and feeding rollers for turning the latter to advance the strip.

53. In a cash register the combination with a series of keys, of a movable registering member, movable means mounted independently of the keys for coupling the keys thereto, and a stationary frame engaged by said movable means to hold the latter in its coupled position during certain movements of the keys.

54. In a cash register, the combination with a series of keys and a counter, of a counter operating rack, a movable frame for supporting said rack, means for moving said frame by said keys to bring the rack into engagement with the counter, and an intermediate member mounted independently of but engaged by said keys and having slot and pin connection with said rack.

55. In a cash register, the combination with a counter, of a reciprocating registering rack; a movable support for said rack; reciprocating rack actuator means, said rack being arranged to accompany said actuator means during both of its reciprocatory movements; and means for effecting engagement and disengagement of said rack with said counter including provisions for simultaneously withdrawing the rack and the actuator in such manner that during the time of disengagement they maintain the same relative position to each other.

56. In a cash register, the combination with a counter, of a pivoted oscillating registering rack; a movable support for said rack; reciprocating rack actuator means including a series of keys, said rack being arranged to accompany said actuator means during both of its oscillatory movements; and means for effecting engagement and disengagement of said rack with said counter including provisions for simultaneously withdrawing the rack and the actuator in such manner that during the time of disengagement they maintain the same relative position to each other.

57. In a cash register, the combination with a counter, of a pivoted reciprocating registering rack; a movable support for said rack; reciprocating rack actuator means including a series of keys, said rack being arranged to accompany said actuator during both of its reciprocatory movements; and means for effecting engagement and disengagement of said rack with said counter including provisions for withdrawing the pivotal point of said rack and the actuating point of said actuator in substantially the same direction during the time of disengagement.

58. In a cash register, the combination with a counter, of a series of reciprocating registering racks for actuating said counter; a movable frame for supporting said racks; reciprocating rack actuator means for each rack including a series of keys therefor, each rack being arranged to accompany its respective actuator during both of its reciprocatory movements; and means controlled by said keys for moving said frame to cause all of said racks to engage and disengage with the counter, including provisions for withdrawing the racks and the actuator in such manner that during the time of disengagement they maintain the same relative position to each other.

59. In a cash register, the combination with a counter, of a series of pivoted reciprocating registering racks, a movable frame for supporting said racks; reciprocating rack actuator means for each rack including a series of keys therefor, each rack being arranged to follow its respective actuator during both of its reciprocatory movements; and means controlled by said keys for moving said frame to cause the engagement and disengagement of said racks with said counter, including provisions for withdrawing the pivotal point of said racks and the actuating point of the actuator in substantially the same direction during the time of disengagement.

60. In a cash register, the combination with a counter, of a reciprocating registering rack; a movable support for said rack; reciprocating rack actuator means constructed to engage said rack positively during both of its reciprocatory movements; and means for effecting engagement and disengagement of said rack with said counter including provisions for simultaneously withdrawing the rack and the actuator in such manner that during the time of disengagement they maintain the same relative position to each other.

61. In a cash register, the combination with a counter, of a pivoted oscillating registering rack; a movable support for said rack; reciprocating rack actuator means including a series of keys, said rack actuator means being constructed to engage said rack positively during both of its oscillatory movements; and means for effecting engagement and disengagement of said rack with said counter including provisions for simultaneously withdrawing the rack and the actuator in such manner that during the time of disengagement they maintain the same relative position to each other.

62. In a cash register, the combination with type carriers, of means for feeding a record medium thereto, a differentially movable setting member for said type carriers, and means operated by said setting member for operating said feeding means.

63. In a cash register, the combination with a printing device, of a differentially movable setting segment therefor, means for feeding a record medium, and means operated by the movement of said setting segment for operating said feeding means.

64. In a cash register, the combination with a printing mechanism, an actuating device therefor and means for giving said device differential movements; of means for feeding a record medium to said printing mechanism, and means operated by every movement of said actuating device for operating said feeding means a constant amount.

65. In a cash register, the combination with a printing mechanism, means for feeding a record medium therefor, and a differentially movable device for differentially adjusting said printing mechanism and operating said feeding means a constant amount.

66. In a cash register, the combination with a series of registering racks, of a shiftable frame carrying same, a series of keys, a member common to said keys, means mounted on said common member controlling said shiftable frame, a latch for said means, means for tripping said latch at the end of the stroke of said common member, the construction being such that the shiftable frame is maintained in shifted position until the common member starts its return movement.

67. In a cash register, the combination with a series of registering racks, of a shiftable frame carrying same, a movable member for shifting said frame, and means for releasing said member at the end of its stroke, the construction being such that the frame remains in shifted position until the member starts its return.

68. In a cash register, the combination with a series of registering racks, of mechanism carrying same, movable means for shifting said mechanism and retaining same shifted, and means for releasing said mechanism from said shifting means at the end of the stroke of the shifting means, the construction being such that the said mechanism is retained in shifted position until the shifting means begins its return movement.

69. In a cash register, the combination with registering mechanism, of operating mechanism therefor arranged to have a one way connection therewith, means for holding the operating mechanism and registering mechanism connected, and means for releasing the holding means at the end of the operating stroke, the construction being such that the connection is maintained until the operating mechanism begins its return movement.

70. In a cash register, the combination with registering mechanism, of keys, an operating mechanism for said registering mechanism having its movement determined by said keys, means for maintaining a connection between said operating and registering mechanisms, and means for withdrawing said maintaining means, the construction being such that the connection is maintained after said means is withdrawn and until said operating mechanism begins to return.

71. In a cash register, the combination with a registering mechanism, of a plurality of operating racks therefor, an independent means for locking each rack in normal position and banks of keys for operating said racks, each key being arranged to first release the locking device corresponding to its bank.

72. In a cash register, the combination with registering mechanism, of racks for operating same, a bank of keys for controlling each rack, an independent locking device for each rack, each key being arranged to operate the locking device for the corresponding rack and then operate the rack.

73. In a cash register, the combination with a registering mechanism, of manipulative devices controlling same, a plurality of operating racks having their motion determined by said devices a rod on which said racks are pivoted, and means to move said rod to carry the racks into and out of mesh with said registering mechanism.

74. In a cash register, the combination with a register of racks for operating same, keys for differentially moving said racks, a rod on which said racks are mounted and means for moving said rod to carry the racks into and out of mesh with said register.

75. In a cash register, the combination with a register, of segmental racks for operating same, a pivoted frame on a rod of which the racks are pivoted, and means for rocking said frame to carry said racks into and out of mesh with said register.

76. In a cash register, the combination with a register, of segmental racks for operating same, manipulative devices determining the extent of movement of said racks, a pivoted frame on an arm of which the racks are pivoted, and means to rock said frame to carry said racks into mesh with said register before the racks are given their operating movement.

77. In a cash register, the combination with a register, of operating devices therefor, keys for moving said operating devices differentially, a pivoted frame including a rod on which said devices are mounted, and means for rocking said frame to carry said operating devices into and out of mesh with said register.

78. In a cash register, the combination with registering mechanism, of segment racks for operating same, a rod on which said racks are pivoted and keys for moving said rod to carry the racks into and out of mesh with the registering mechanism.

79. In a cash register, the combination with a registering mechanism, of racks for operating same, a frame including a rod on which said racks are pivoted and means for rocking said frame to carry said racks into mesh with said registering mechanism.

80. In a cash register, the combination with a register, of segment racks for operating said register, a frame including a rod on which said segment racks are pivoted, and keys for rocking said frame to carry said racks into mesh with said register and for operating said racks.

81. In a cash register, the combination with a register, of segment racks for operating same, a rod on which said segment racks are pivoted and keys for moving said rod to carry said racks simultaneously into and out of mesh with said register.

82. In a cash register, the combination with a register, of racks for operating same, a pivoted frame including a rod on which said racks are mounted, and keys for rocking said frame to carry said racks simultaneously into and out of mesh with said racks.

83. In a cash register, the combination with a register, of segment racks for differentially operating same, a rod on which said racks are pivoted, and keys for moving said rod to carry said racks into and out of mesh with said register and for differentially operating said racks.

84. In a cash register, the combination with a register, of racks for differentially operating same, a frame including a rod on which said racks are mounted, and keys for rocking said frame to carry said racks simultaneously into and out of mesh with said register and for operating said racks differentially.

THOMAS CARROLL.

Witnesses:
ALVAN MACAULEY,
IRA BERKSTRESSER.

It is hereby certified that in Letters Patent No. 879,081, granted February 11, 1908, upon the application of Thomas Carroll, of Dayton, Ohio, for an improvement in "Cash-Registers," errors appear in the printed specification requiring correction, as follows: On page 4, line 2, the word "piece" should read *pieces;* page 5, line 43, the word "lower" should read *lever;* same page, line 111, the word "registration" should be stricken out, and page 7, line 114, the word *simultaneously* should be inserted after the word "and"; and that the said Letters Patent should be read with these corrections therein that the same may conform to the record of the case in the Patent Office.

Signed and sealed this 31st day of March, A. D., 1908.

[SEAL.]

C. C. BILLINGS,
*Acting Commissioner of Patents.*